(12) United States Patent
Thomas et al.

(10) Patent No.: US 8,407,734 B2
(45) Date of Patent: *Mar. 26, 2013

(54) BROADCASTING RECEIVER AND METHOD OF TRANSMITTING / RECEIVING BROADCASTING SIGNAL

(75) Inventors: Gomer Thomas, Piscataway, NJ (US); Jae Hyung Song, Seoul (KR); Mark Eyer, San Diego, CA (US)

(73) Assignee: LG Electronics Inc., Seoul (KR)

( * ) Notice: Subject to any disclaimer, the term of this patent is extended or adjusted under 35 U.S.C. 154(b) by 568 days.

This patent is subject to a terminal disclaimer.

(21) Appl. No.: 12/219,553

(22) Filed: Jul. 23, 2008

(65) Prior Publication Data

US 2009/0178094 A1    Jul. 9, 2009

Related U.S. Application Data

(60) Provisional application No. 60/951,715, filed on Jul. 25, 2007.

(51) Int. Cl.
    *H04N 7/173* (2011.01)
(52) U.S. Cl. .......................................... 725/28; 725/50
(58) Field of Classification Search .................. None
    See application file for complete search history.

(56) References Cited

U.S. PATENT DOCUMENTS

| 6,529,526 | B1 | 3/2003 | Schneidewend |
| 8,087,043 | B2* | 12/2011 | Eyer et al. ........................ 725/28 |
| 2003/0046100 | A1* | 3/2003 | Yamauchi .......................... 705/1 |
| 2006/0062200 | A1 | 3/2006 | Wang et al. |
| 2006/0242683 | A1* | 10/2006 | Medford et al. ............. 725/139 |
| 2007/0086459 | A1 | 4/2007 | Hirota et al. |
| 2007/0101385 | A1* | 5/2007 | Jun ................................ 725/112 |
| 2007/0204289 | A1* | 8/2007 | Kim ................................ 725/28 |
| 2007/0220542 | A1* | 9/2007 | Kim ................................ 725/28 |

FOREIGN PATENT DOCUMENTS

| CN | 1224972 A | 8/1999 |
| CN | 1864388 A | 11/2006 |
| CN | 1893633 A | 1/2007 |

OTHER PUBLICATIONS

Advanced television systems committee, ATSC standard: porgram and system information protocol for terrestrial broadcast and cable Mar. 18, 2003, (rev B) doc. A/65B.*
Consumer Electronics Association, Downloadable US Region rating system white paper, Dec. 15, 2005, CEA 2005 Technology & Standards Depart. whole document.*
ATSC Standard (Doc. A/65B) Program and System Information Protocol for Terrestrial Broadcast and Cable (Revision B) Mar. 18, 2003.
ATSC, "ATSC Standard: Program and System Information Protocol for Terrestrial Broadcast and Cable (Revision B)", Mar. 18, 2003.
CEA, "Downloadable U.S. Region Rating System White Paper" Dec. 15, 2005.

* cited by examiner

*Primary Examiner* — Vivek Srivastava
*Assistant Examiner* — Rong Le
(74) *Attorney, Agent, or Firm* — McKenna Long & Aldridge LLP

(57) ABSTRACT

A method of transmitting/receiving a broadcasting signal and a broadcasting receiver are disclosed. A rating region table (RRT) including a rating value identifier identifying rating information is stored, and, when broadcasting contents are received, the rating value identifier is obtained from a descriptor (or service discovery information) including the rating information of the contents. Then, the received broadcasting contents can be blocked according to the rating value identifier obtained from the descriptor and the rating value identifier of the RRT. Accordingly, although the RRT is changed, the broadcasting contents can be conveniently blocked using the unchanged rating value identifier.

20 Claims, 13 Drawing Sheets

FIG. 6

| Syntax | No. of Bits | Format |
|---|---|---|
| rating_region_table_section() { | | |
|     table_id | 8 | 0xCA |
|     section_syntax_indicator | 1 | '1' |
|     private_indicator | 1 | '1' |
|     reserved | 2 | '11' |
|     section_length | 12 | uimsbf |
|     table_id_extension { | | |
|         reserved | 8 | 0xFF |
|         rating_region | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     rating_region_name_length | 8 | uimsbf |
|     rating_region_name_text() | var | |
|     dimensions_defined | 8 | uimsbf |
|     for(i=0; i<dimensions_defined;i++) { | | |
|         dimensions_name_length | 8 | uimsbf |
|         dimensions_name_text() | var | |
|         reserved | 3 | '111' |
|         graduated_scale | 1 | bslbf |
|         values_defined | 4 | uimsbf |
|         for(j=0; j<values_defined;j++) { | | |
|             abbrev_rating_value_length | 8 | uimsbf |
|             abbrev_rating_value_text() | var | |
|             rating_value_length | 8 | uimsbf |
|             rating_value_text() | var | |
|         } | | |
|     } | | |
|     reserved | 6 | '111111' |
|     descriptors_length | 10 | uimsbf |
|     for(i=0; i<N;i++) { | | |
|         descriptor() | | |
|     } | | |
|     CRC_32 | 32 | rpchof |
| } | | |

BROADCASTING RECEIVER AND METHOD OF TRANSMITTING / RECEIVING BROADCASTING SIGNAL

This application claims the benefit of U.S. Provisional Application No. 60/951,715, filed on Jul. 25, 2007, in the name of inventors Jae Hyung SONG, titled "METHOD FOR TRANSMITTING A DATA, BROADCASTING RECEIVER AND METHOD FOR RECEIVING A BROADCASTING SIGNAL", which is hereby incorporated by reference.

BACKGROUND OF THE INVENTION

1. Field of the Invention

The present invention relates to a broadcasting receiver and a method of transmitting/receiving a broadcasting signal, and more particularly, to a method of transmitting/receiving a broadcasting signal via an Internet protocol (IP) and a broadcasting receiver for receiving the broadcasting signal.

2. Discussion of the Related Art

A conventional television (TV) system transmits contents, which are manufactured by a broadcasting station, via a transmission medium such as terrestrial, cable or satellite broadcast, and a user views a broadcasting signal transmitted via the transmission medium using a receiver.

However, in addition to the existing analog broadcast, as digital TV technology has been developed and has come into wide use, a service including a variety of contents such as real-time broadcast, contents on demand (CoD), games or news can be provided to the user using a home Internet network as well as the existing transmission medium.

Examples of the provision of the service using the Internet network include an Internet protocol TV (IPTV) system. The IPTV system provides information services, moving picture contents and broadcast to the TV receiver using a very high speed Internet network. The IPTV system can receive a service including moving pictures and broadcasting contents using the Internet network. An IP-based wired/wireless network may be used as the Internet network. The IPTV system is similar to the cable or satellite broadcast in that a service including contents such as a video signal is provided, but is characterized in that bi-directional communication is possible. The IPTV system allows the user to view a desired service at his/her convenient time, unlike the terrestrial, cable or satellite broadcast.

Meanwhile, in the IPTV system, a rating criterion of the contents provided by a service provider may be changed. However, in a case where broadcasting contents provided to a broadcasting receiver are blocked according to a predetermined rating criterion, if the rating criterion is changed, the contents may not be blocked according to the intention of the user.

SUMMARY OF THE INVENTION

Accordingly, the present invention is directed to a broadcasting receiver and a method of transmitting/receiving a broadcasting signal that substantially obviate one or more problems due to limitations and disadvantages of the related art.

An object of the present invention is to provide a method of transmitting/receiving a broadcasting signal and a broadcasting receiver, which are capable of conveniently operating the broadcasting receiver according to rating information.

Another object of the present invention is to provide a method of transmitting/receiving a broadcasting signal and a broadcasting receiver, which are capable of easily allowing the broadcasting receiver to block contents although a rating criterion is changed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a broadcasting receiver is disclosed. A reception unit receives a broadcasting signal in accordance with an internet protocol, and a demultiplexer demultiplexes the broadcasting signal into a metadata stream including configuration tables and a service stream including a broadcasting content. A storage in the broadcasting receiver stores configuration tables including a rating table, the rating table having at least one rating level with respect to at least one rating criterion. A first decoder decodes the broadcasting contents and a second decoder decodes the configuration tables and obtains a rating value identifier identifying a specific rating value with respect to a rating criterion from one of the configuration tables. And a controller controls the broadcasting content to be blocked in accordance with the rating value identifier, wherein the rating value identifier keeps on identifying the specific rating value, although the rating level is changed in the rating table.

In another aspect of the present invention, a method of receiving a broadcasting signal is disclosed. In the method, a broadcasting signal in accordance with an internet protocol (internet protocol) is received. The broadcasting signal is demultiplexed into a metadata stream including configuration tables and a service stream including a broadcasting content. And the configuration tables including a rating table is stored, in which the rating table has at least one rating level with respect to at least one rating criterion. And a rating value identifier identifying a specific rating value with respect to a rating criterion from one of the configuration tables is obtained and the broadcasting content is controlled to be blocked in accordance with the rating value identifier, in which the rating value identifier keeps on identifying the specific rating value, although the rating level is changed in the rating table.

In another aspect of the present invention, a method of transmitting a broadcasting signal is disclosed. The method includes generating a rating table including at least one rating level with respect to at least one rating dimension, generating a configuration table including a rating value identifier identifying a specific rating value in the rating table, generating a broadcasting signal including the rating table and the configuration table and transmitting the broadcasting signal in accordance with an internet protocol (internet protocol). The rating value identifier keeps on identifying the specific rating value, although the rating level is changed in the rating table.

The rating table may be a Rating Region Table (RRT). The RRT includes the rating value identifier as a tag value. The one of the configuration tables from which the second decoder obtains the rating value identifier, may be a program map table (PMT). The rating value identifier may be included in a content advisory descriptor. The rating criterion is a dimension and the rating level is a level index.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a view showing the bit stream syntax of a rating region table (RRT);

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an IPTV system for transmitting/receiving digital contents using an IP will be described, but the present invention is not limited to the IPTV system.

Figure 1:
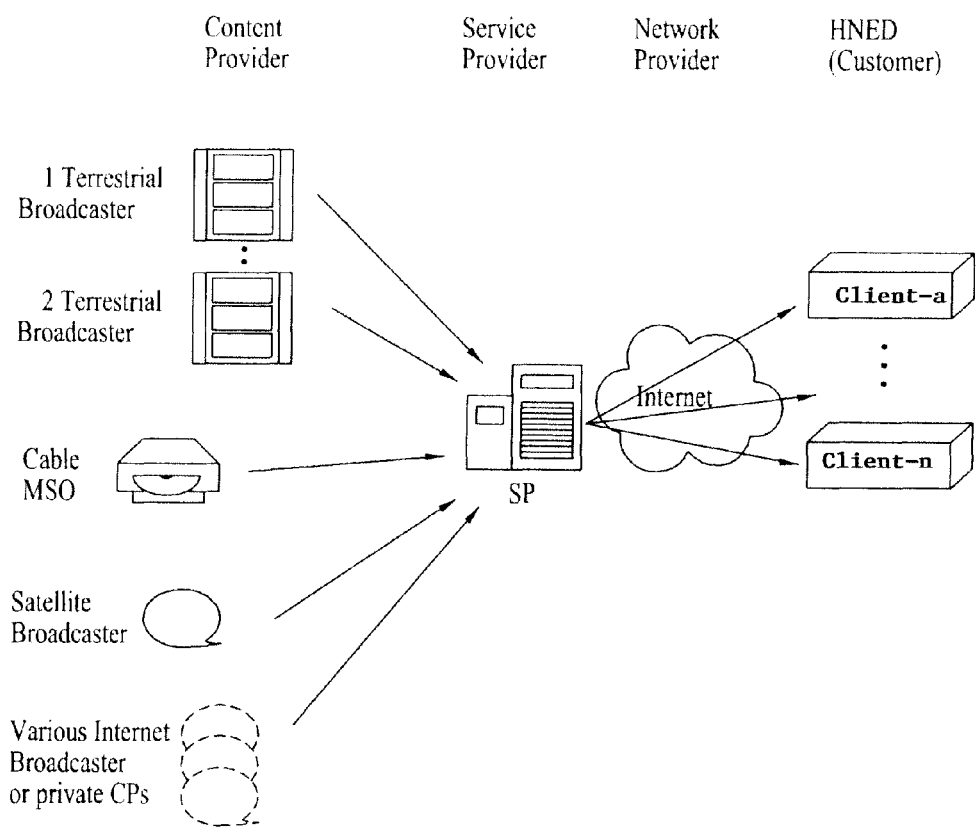
FIG. 1 is a view showing an IPTV system.

FIG. 1 is a view showing an IPTV system.

The IPTV system which transmits/receives contents using an Internet network includes a transmission server, a network and a receiver.

The IPTV transmission server includes a plurality of servers such as a service discovery server for transmitting service discovery and selection information, a streaming server, a broadband content guide (BCG) for transmitting content guide information, a customer information server, and a payment information server.

The streaming server transmits moving picture data encoded by a moving picture experts group (MPEG)-2 or MPEG-4 scheme to a user via a network in the streaming form. A protocol such as a real-time transport protocol (RTP) or a RTP control protocol (RTCP) may be used.

In a case of using a real-time streaming protocol (RTSP; RFC2326), a broadcasting receiver can control a moving picture stream received from the server to a certain extent via a function which is called "network trick play", such as Pause, Replay or Stop.

The BCG server can store BCG data including schedule information of the broadcasting contents and provide the stored BCG data to the broadcasting receiver. The BCG data includes stream connection information via the RTSP/RTP such that the broadcasting receiver can be connected to the streaming server.

In the following embodiment, service event information is included in the BCG data and the BCG data is provided to the broadcasting receiver. Here, the service event information includes schedule information of a service including transmitted contents, or detailed information on the service or the contents.

Among the servers, the service discovery server can provide the service discovery information to the broadcasting receiver. Hereinafter, the service discovery information is referred to as a service discovery record. The service discovery information includes access information of the servers for providing the service including the contents, such as broadcast, video on demand (VOD), a game and a BCG, and service selection information. In more detail, the service discovery record may include a broadcast discovery record including the discovery information of the contents associated with a broadcasting network, COD discovery information including the content discovery information associated with the VOD or the COD, and BCG discovery information including the discovery information associated with a broadcasting schedule.

The service discovery server separates the services provided via a plurality of different IP-based networks and provides the receiver with the service discovery information for allowing the broadcasting receiver to discover and select a service. The service discovery information may include a service list which can be provided via the network or location information of the service in the network such that the receiver can discover the service in the network.

The broadcasting receiver can select a service using the service selection information in the service information (SI) record including information on the transmission of the service received from the service discovery server.

A network provider includes an Internet-based network and gateways. The gateways perform multicast group management using a protocol such as an Internet Group Management Protocol (IGMP) and quality of service (QoS) management, in addition to the transmission of general data.

The broadcasting receiver includes an IPTV settop, a homenet gateway, and an IPTV embedded TV on the basis of the IP. The broadcasting receiver can establish a home network end device (HNED) and provide the received service to the user.

A hybrid IPTV system can provide the user with conventional broadcasting contents, a variety of broadcasting contents such as broadcast, satellite broadcast or private broadcast, a variety of Internet image contents, or data contents other than the image contents. The contents can be provided to the broadcasting receiver in real time or on demand.

In the example of FIG. 1, the IPTV system is divided into a content provider, a service provider, a network provider and a broadcasting receiver. The content provider can generate and provide broadcasting contents. In the example of FIG. 1, the content provider includes a first terrestrial broadcaster, a second terrestrial broadcaster, a cable multiservice operator (MSO), a satellite broadcaster and a plurality of Internet broadcasters.

The service provider provides the contents provided by the content provider to the user as a service. The service provider can provide the service to the user according to an IP-based communication method such as a unicast or multicast method.

Figure 2:
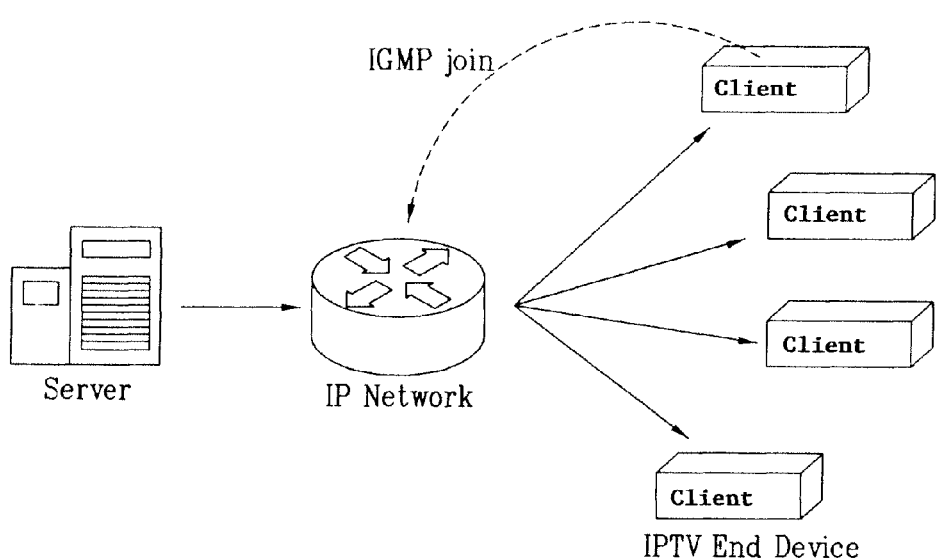
FIGS. 2 and 3 are views showing a multicast method and a unicast method, respectively.
Figure 3:
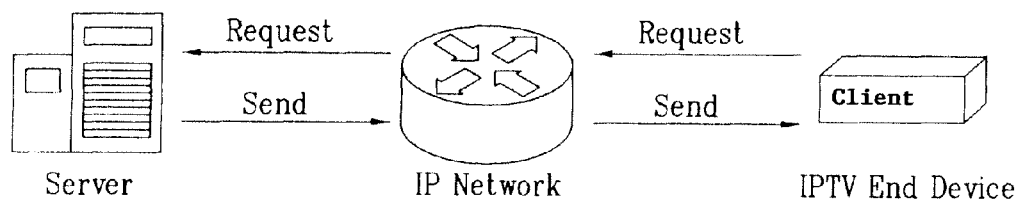

FIGS. 2 and 3 are views showing a multicast method and a unicast method, respectively.

The multicast method shown in FIG. 2 indicates a method of transmitting data to a plurality of clients in a specific group. The multicast method can simultaneously transmit the data to the plurality of clients which are registered in the server. In order to perform the multicast method, the server simultaneously transmits the data to the plurality of clients which are registered in the IGMP.

FIG. 3 shows the unicast method of transmitting/receiving data in a state in which the server and the client one-to-one correspond to each other. According to the unicast method, when the client requests the data to the server, the server transmits the data to the client.

Figure 4:
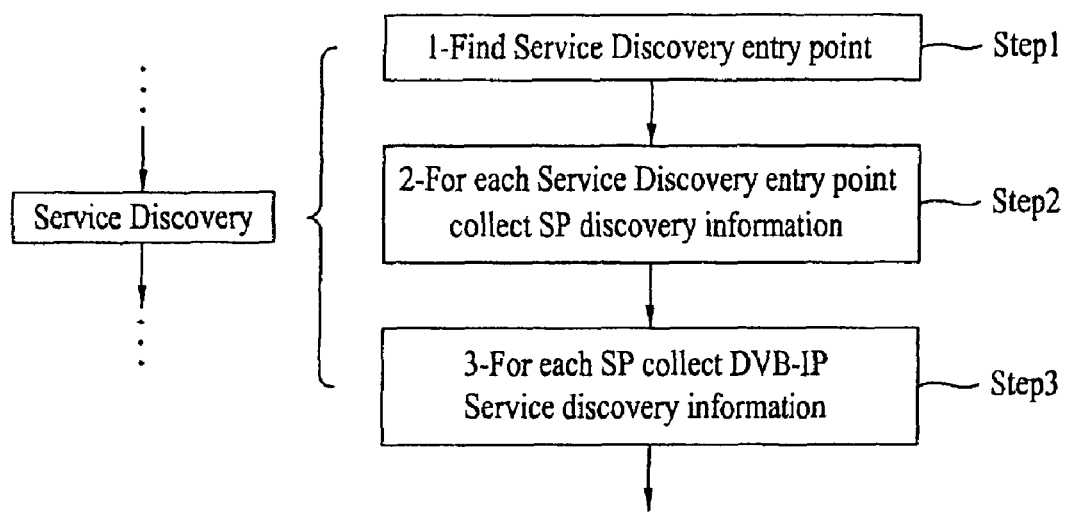
FIG. 4 is a view showing an example of receiving a service discovery record in order to receive broadcasting contents.

FIG. 4 is a view showing an example of receiving a service discovery record in order to receive broadcasting contents.

The service discovery record may include a service event information element, together with an element such as a service location, a textual identifier and service information.

The receiver finds a service discovery entry point (step 1). Here, the entry point indicates information for entering into the service such that the receiver receives the service, that is, access information or an access server for accessing the service for service connection. For the service discovery entry point, service provider information for providing the service or contents is collected (step 2). Information necessary for selecting the collected service provider is obtained (step 3). As a protocol for transmitting/receiving information which can discover and select the service, a Service Discovery & Selection (SD&S) protocol may be used. In the SD&S protocol, for example, a model for providing information on service discovery and selection according to the communication concept shown in FIG. 1 is defined.

The service discovery record may include a rating region table (RRT), a content advisory descriptor and respective rating value identifiers included therein. The detailed examples thereof will be described with reference to FIGS. 6 to 14.

Figure 5:
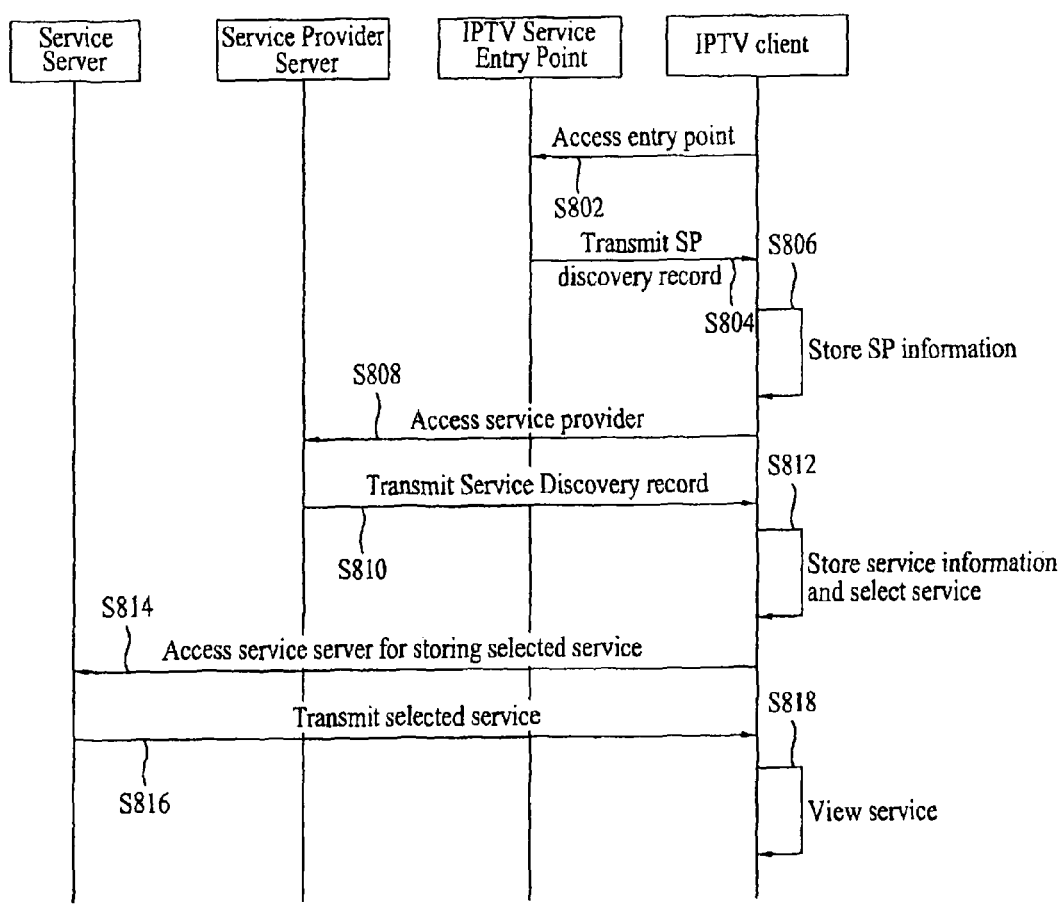
FIG. 5 is a view showing a method of transmitting/receiving a broadcasting signal according to an embodiment of the present invention.

FIG. 5 is a view showing a method of transmitting/receiving a broadcasting signal according to an embodiment of the present invention. FIG. 5 shows the flow and the sequence of signals among the service server, the service provider server, the entry point of the IPTV system operator and the client.

When the client accesses the entry point of the IPTV system operator (S802), the IPTV system operator checks subscription information of the client. The IPTV system operator checks whether or not the client can receive a service associated with the IPTV system operator.

In a case where the client joins the service provided by the system operator, the IPTV system operator transmits a service provider (SP) discovery record to the client (S804).

The client stores the received SP discovery record information (S806). The service SP discovery record information may include an entry number and access information of the service provider.

The client accesses the service provider server using access information of the service provider (S808).

When the client accesses the service provider server, the service provider server transmits the service discovery record to the client (S810).

The client stores the received service discovery record (S812). The service discovery record may include a channel number and access information of the service server. In a case where a user definition service is registered and used in the client, the entry number of the user definition service, the channel number and the access information may be stored in the client.

The client accesses the service server storing a content the user selects (S814). For example, when the user inputs the number of the service to be received to the client, the client may access the service server using the entry number and the channel number.

The service server transmits service data to the accessing client (S816).

The client receives the service data from the service server and outputs the service to the user (S818).

FIG. 6 is a view showing the bit stream syntax of the RRT. An example of transmitting/receiving rating information will be described with reference to FIG. 6.

The RRT may include the rating information such that the broadcasting receiver can control the output of the broadcasting contents. The transport stream packet including the RRT section may have a PID value of 0x1FFB.

In the example of FIG. 6, a table_id field is a value for identifying the RRT and may have 0xCA. A section_syntax_indicator field is a 1-bit field indicating whether or not the section exceeds a predetermined length. A private_indicator field may be set to a value of 1 and a section_length field may indicate the length of the section. In a rating_region field, information on region to which the rating information included in the RRT is applied is set. A version_number field indicates the version number of the RRT. A current_next_indicator field is set to 1. A section_number field, a last_section_number field and a protocol_version field may be always set to 0x00.

A rating_region_name_text field indicates the rating region name, in which the rating information is set, in a string format, and a rating_region_name_length field indicates the length of the string. A dimension_defined field indicates the number of dimensions delivered by the RRT, a dimension_name_length field indicates the length of the dimension_name_text field, and the dimension_name_text field indicates the dimension in the string format.

A graduated_scale field indicates whether or not the rating information has a scale which is increased with respect to the dimension. For example, if the dimension is age, the dimension may have a scale which is increased/decreased according to the age.

A values_defined field indicates the number of values defined in the dimension. An abbrev_rating_value_length field indicates the length of an abbrev_rating_value_text field and the abbrev_rating value_text field indicates the abbreviated name of a specific rating value. A rating_value_length field indicates the length of a rating_value_text field and the rating_value_text field indicates the full name of a specific rating value.

The RRT may further include a descriptor.

The RRT of FIG. 6 defines the rating values according to the dimension and the value_defined field. The rating values according to the value_defined field of the dimension may be arranged according to a value such as a level. Accordingly, the RRT may be defined by a two-dimensional array according to the dimension and the level. For example, if the dimension of a column is the age, the ages are arranged in a row. At this time, the row may be called the level.

Figure 7:
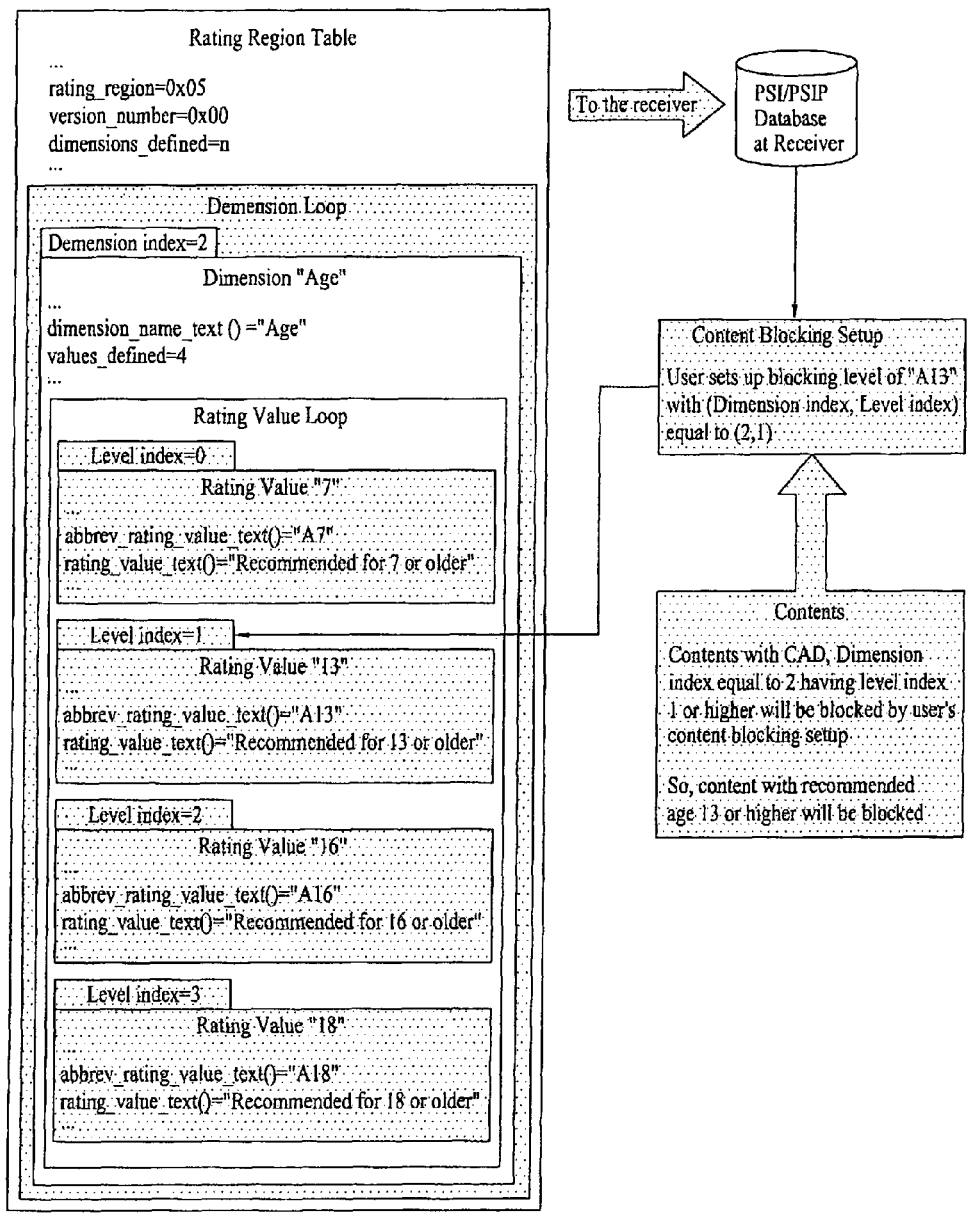
FIG. 7 is a view showing an example in which a broadcasting receiver receives and blocks broadcasting contents when the RRT shown in FIG. 6 is received.

FIG. 7 is a view showing an example in which a broadcasting receiver receives and blocks broadcasting contents when the RRT shown in FIG. 6 is received.

In FIG. 7, the broadcasting receiver receives and stores the RRT in a data storage (PSI/PSIP storage). The RRT may be transmitted to an IP broadcasting receiver in a state of being included in the service discovery record.

At this time, the received RRT has a two-dimensional value as shown in the left side of FIG. 7. For example, if the dimension is the age, the rating value is transmitted according to the levels by a rating value loop. The levels shown in FIG. 7 are 7, 13, 16 and 18. For example, the user can set the contents for a 13-year-old or older to be blocked in the broadcasting receiver.

When the rating value is set in the broadcasting receiver, the rating information which will be blocked may be set using the dimension of the RRT and the level index of the dimension.

If the contents for a 13-year-old or older are set to be blocked, the broadcasting receiver stores a two-dimensional value (dimension, level index) of (2, 1) and blocks the broadcasting contents according to the stored value. That is, in FIG. 7, since the dimension "age" is 2 and the level index corresponding to age 13 is 1, the broadcasting receiver can block the broadcasting contents using the two values.

The rating value of the broadcasting contents may be transmitted in a state of being included in program table information such as a program map table (PMT). The rating values may be included in content_advisory_descriptor in the PMT. The broadcasting receiver may parse the content_advisory_descriptor, compare the rating value of the contents with the rating value set by the user, and determine whether or not the contents are blocked. At this time, from the content_advisory_descriptor, if the rating information of specific contents is (2, 1) or the level index of the rating information is larger than that of (2, 1), the contents are blocked.

Meanwhile, the broadcasting receiver may receive the RRT in which the rating information of the RRT stored in the broadcasting receiver is changed, in accordance with the downloadability characteristics of the RRT. For example, if the RRT is changed, the version number of the RRT is changed. The broadcasting receiver checks the version number of the RRT and stores the changed RRT if the RRT is changed.

Figure 8:
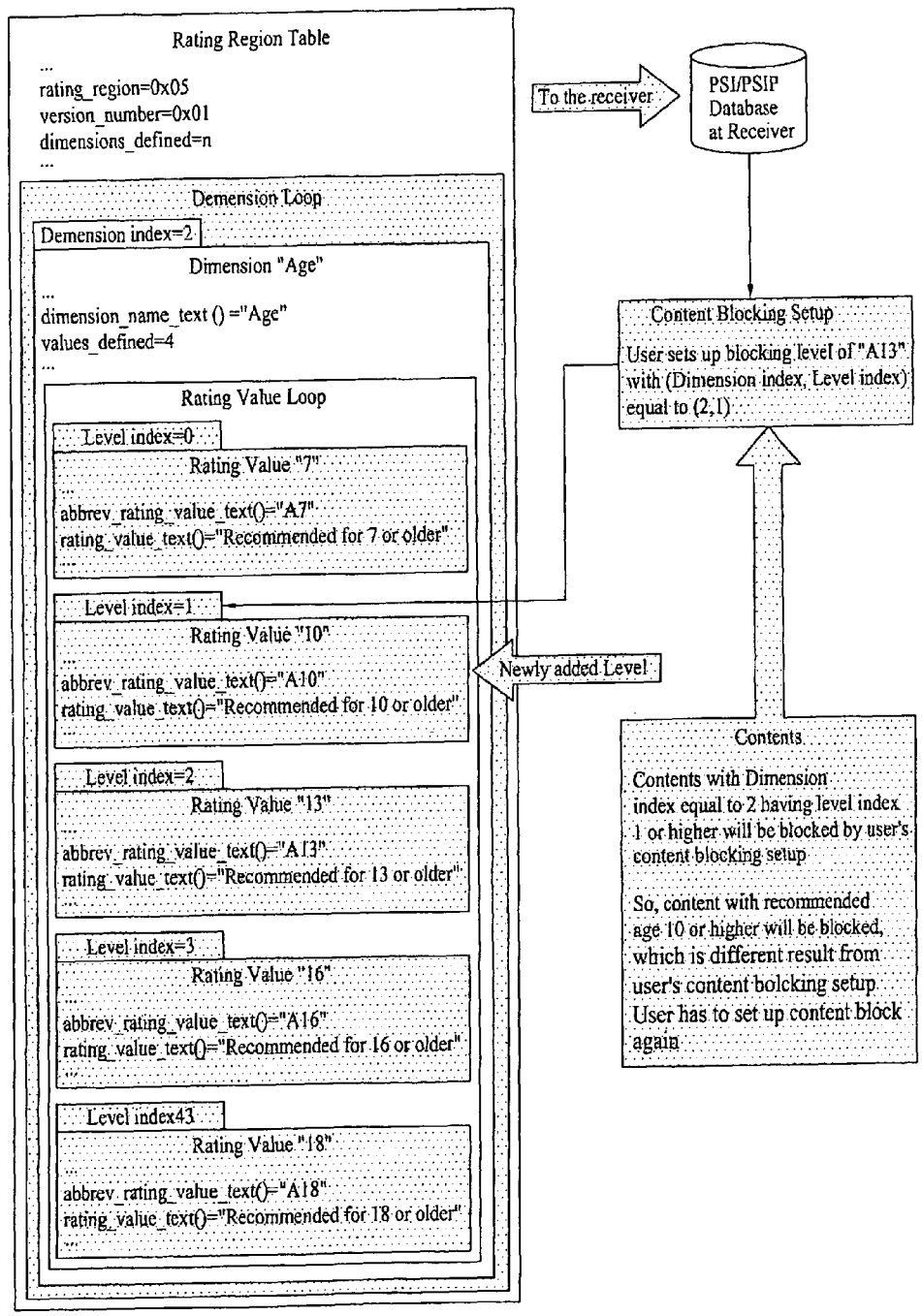
FIG. 8 is a view showing an operation performed when the broadcasting receiver receives a changed RRT.

FIG. 8 is a view showing an operation performed when the broadcasting receiver receives the changed RRT, similar to FIG. 7. In FIG. 8, the changed RRT is obtained by adding the rating value for age 10 to the RRT of FIG. 7. The RRT of FIG. 8 may be transmitted to the IP broadcasting receiver in a state of being included in the service discovery record. In the RRT of FIG. 8, a new level is inserted between the levels of FIG. 7. Accordingly, with respect to the level indexes of age 10 or higher (that is, if the level index is 1 or more), the level indexes are increased from those of FIG. 7 by 1.

However, the broadcasting receiver blocks the broadcasting contents by the value (dimension, index level) set in the broadcasting receiver. The broadcasting receiver obtains the rating value of the broadcasting contents from the content_advisory_descriptor by the value (dimension, level index) of the broadcasting contents. Accordingly, when the broadcasting receiver receives specific broadcasting contents having the rating value of (2, 1), the contents are blocked. Accordingly, when the broadcasting receiver which blocked the broadcasting contents for a 13-year-old or older according to the rating value of (2, 1) in FIG. 7 receives the changed RRT, the broadcasting receiver also blocks the broadcasting contents for a 10-year-old or older because the value of (2, 1) corresponds to age 10. Although the user sets the broadcasting contents for a 13-year-old or older to be blocked in the broadcasting receiver, the broadcasting receiver blocks the contents for a 10-year-old or older. As a result, the broadcasting receiver may block the broadcasting contents differently from the intention of the user, unless the user recognizes the change of the RRT and changes the rating information set in the broadcasting receiver.

Figure 9:
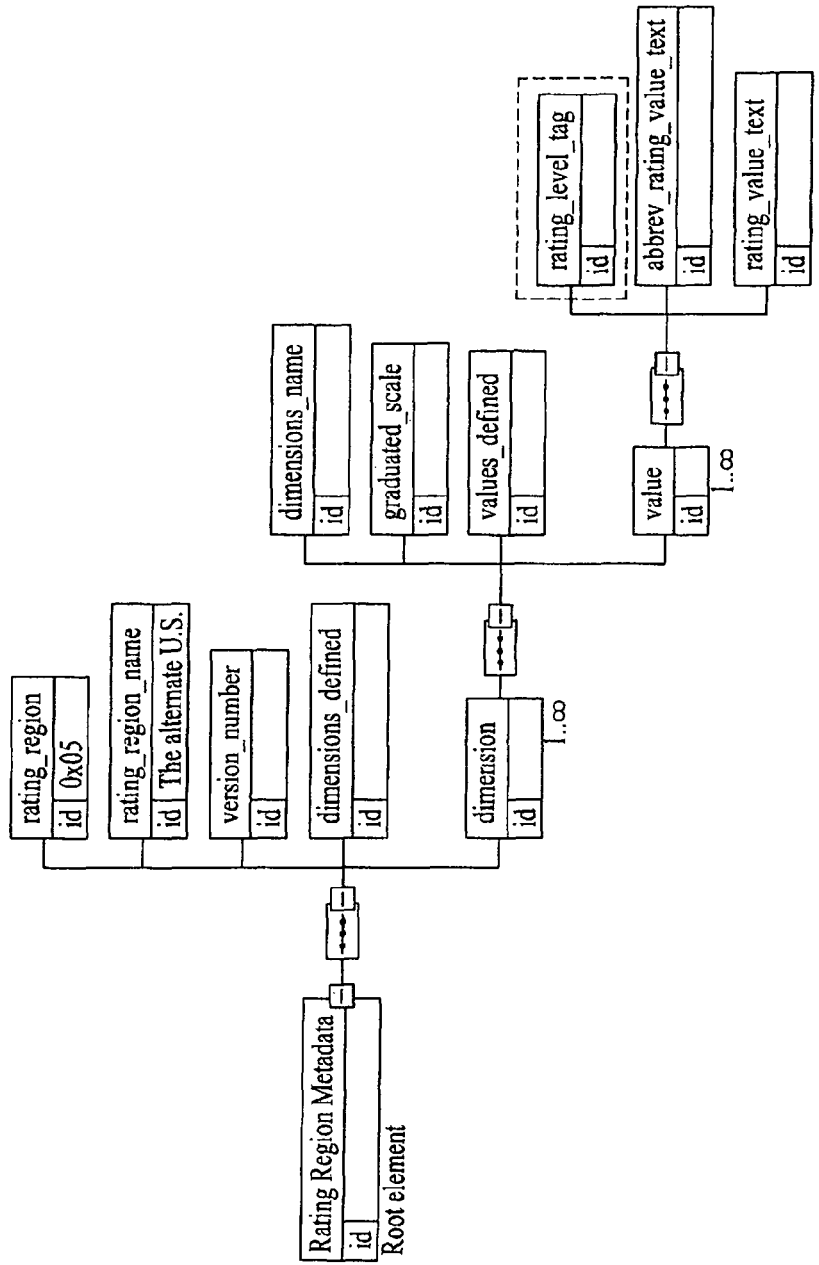
FIG. 9 is a view showing the structure of rating region metadata in the service discovery record.

FIG. 9 is a view showing the structure of rating region metadata, in which a criterion of the rating value is set, in the service discovery record. FIG. 9 shows the RRT shown in FIG. 6 by an XML format data structure.

The rating region metadata including the RRT may include a rating_region element, a rating_region_name element, a version_number element, a dimensions_defined element, and a dimension element. These elements may include the same information as the rating_region field, the rating_region_name_text field, the version_number field and the dimension_defined field in FIG. 6. In addition, the dimension element may include information set in the field in the loop according to the dimension_defined field of FIG. 6. In FIG. 9, the dimension element may include a dimension_name element, a gradulated_scale element, a values_defined element and a value element. The information included in the dimension element is equal to the dimension_name_text field, the gradulated_scale field, the values_defined field and information on the field included in the loop according to the values_defined field in FIG. 6.

Information included in an abbrev_rating_value_text element and a rating_value_text element included in the value element is equal to the information on the abbrev_rating_value_text field and the rating_value_text field of FIG. 6.

The value element of FIG. 9 may include information identifying a specific rating value. In FIG. 9, the information identifying the specific rating value is represented by a rating level tag. The rating level tag is a rating value identifier. The rating level tag may keep on identifying the rating value and may be set as a tag value, although the level index is changed, that is, although the level is added to the RRT.

Accordingly, the broadcasting receiver can receive the rating region metadata and store the criterion of the rating information.

Figure 10:
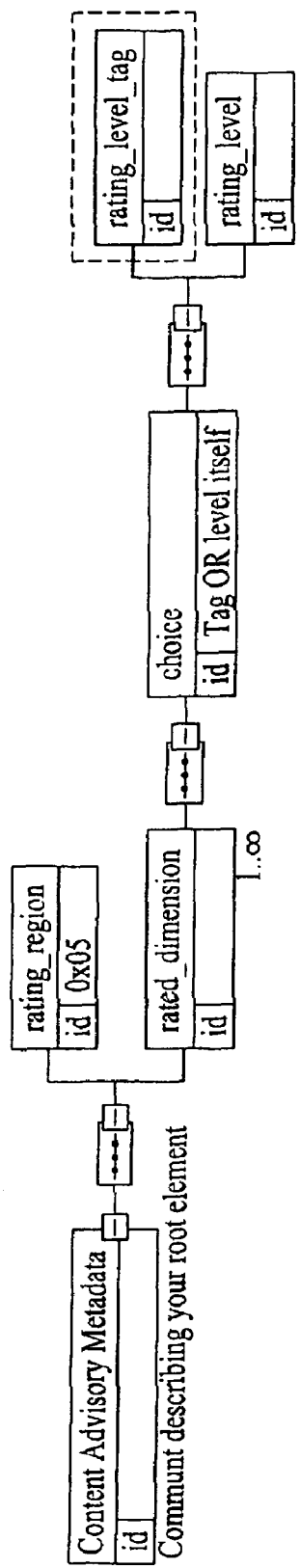
FIG. 10 is a view showing the structure of content advisory metadata in the service discovery record.

FIG. 10 is a view showing the structure of data including the rating information of the contents received by the broadcasting receiver.

In FIG. 10, an element including the rating information of the broadcasting contents is called content advisory metadata. This element may include the same information as the content advisory descriptor shown in FIGS. 7 and 8. For example, the content advisory metadata may have a rating region element for delivering a rating region and a rated dimension element for defining the dimension of the rating value.

The rated dimension element may include a rating_level_tag element which is information identifying a specific rating value with respect to the contents and a rating_level element indicating the rating level according to the rating value in the RRT. The broadcasting receiver can receive the rating value of the contents from the content advisory metadata and block the contents according to the rating region metadata of FIG. 9.

The rating region metadata of FIG. 9 and the content advisory metadata of FIG. 10 may be transmitted to the IP broadcasting receiver in a state of being included in the service discovery record.

Figure 11:
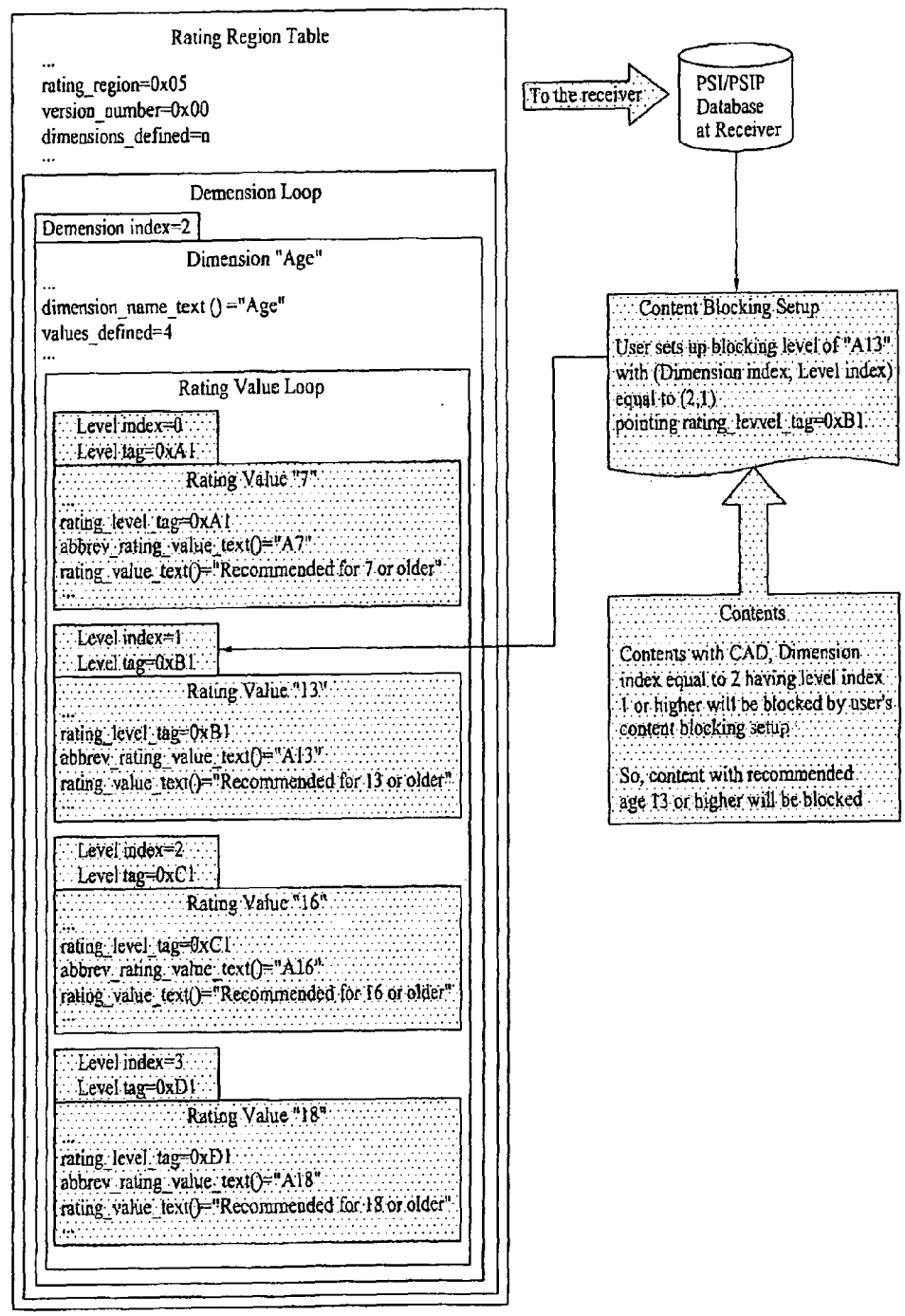
FIGS. 11 and 12 are views showing examples of blocking broadcasting contents using the information shown in FIGS. 9 and 10.
Figure 12:
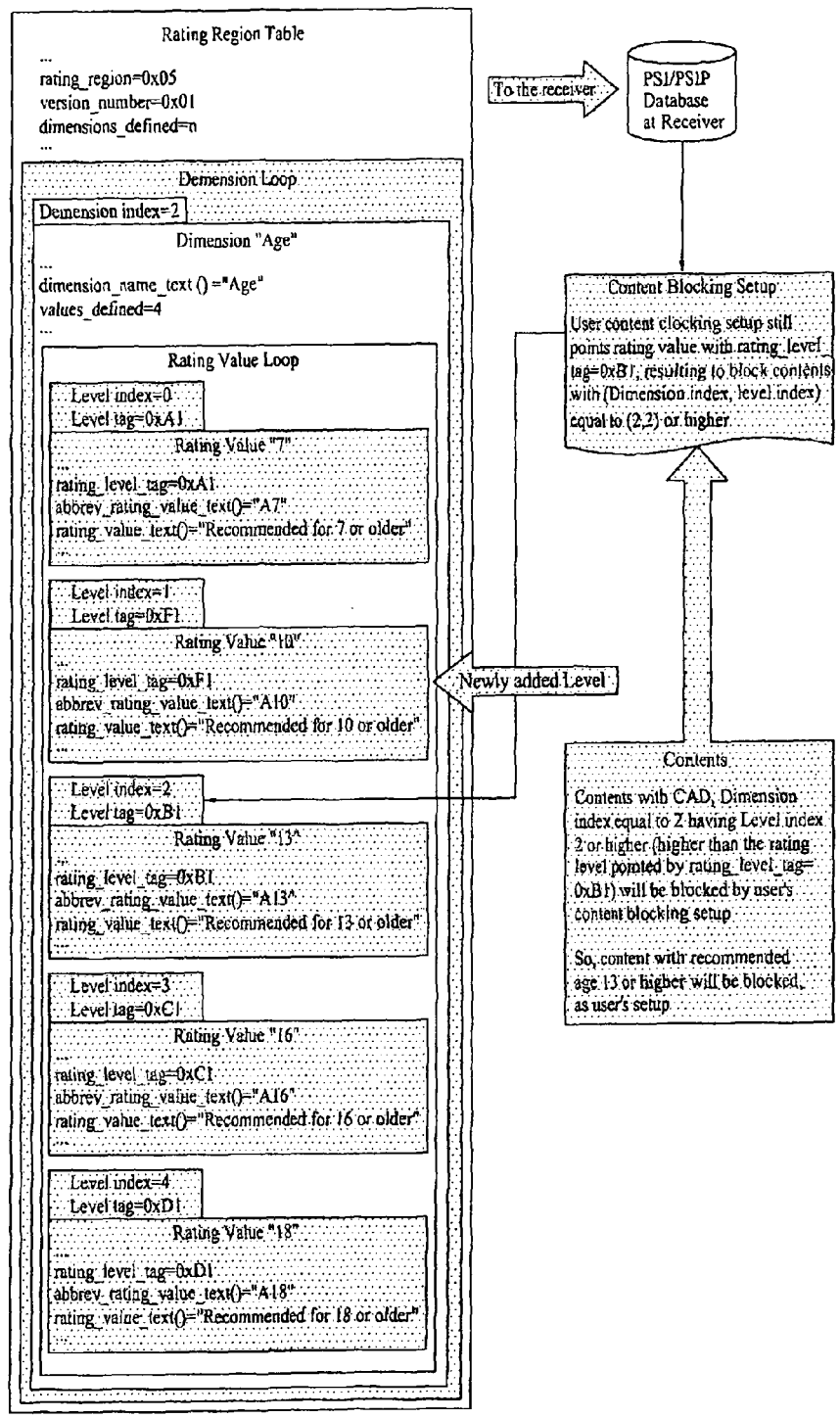

FIGS. 11 and 12 are views showing examples of blocking broadcasting contents using the information shown in FIGS. 9 and 10.

For convenience of description, it is assumed that the broadcasting receiver stores the RRT similar to that shown in FIG. 7 in the example of FIG. 11. The RRT may be included in the service discovery record in the service discovery step.

However, unlike FIG. 7, the RRT of FIG. 11 has a level tag value identifying the rating value. In the example of FIG. 11, the dimension is the age and the rating values of the dimension are 7, 13, 16 and 18 with respect to the level indexes of 0 to 3. Accordingly, in the rating values, the value (dimension, level) is (2, 0) in the rating value 7, is (2, 1) in the rating value 13, is (2, 2) in the rating value 16 and is (2, 3) in the rating value 18.

The rating information is set in the broadcasting receiver according to the control of the user. At this time, as shown in FIG. 11, instead of the two-dimensional rating information (dimension, level), the rating information is set in the stored RRT by the level tag value and the broadcasting contents are set in the broadcasting receiver. For example, in FIG. 11, if the user sets the rating information such that a 13-year-old or younger child can view the contents, the rating information is set by the level tag information in the broadcasting receiver, instead of setting the rating information by the value (dimension, level) of (2, 1).

Accordingly, when the broadcasting receiver obtains the rating information of the received contents from the content advisory metadata included in the service discovery record, the contents which should be blocked are identified and blocked according to the level tag value. In FIG. 11, the broadcasting contents including the rating information having the level tag value smaller than 0xB1 are blocked.

FIG. 12 shows the operation of the broadcasting receiver when the RRT shown in FIG. 11 is changed. In the RRT of FIG. 12, the level corresponding to age 10 is added to the dimension "age". Accordingly, the level index 1 corresponding to age 10 is added to that shown in FIG. 11 and the level indexes corresponding to ages 13, 16 and 18 are respectively increased by 1 so as to become 2, 3 and 4. Meanwhile, the level tag of the added level corresponding to age 10 is 0xF1. If the version of the RRT is changed, the broadcasting receiver can store the RRT shown in FIG. 12.

The broadcasting receiver can obtain the rating value of the received broadcasting contents from the content advisory metadata. In this case, the broadcasting receiver can obtain the rating value identifier (0xB1) instead of the value (dimension, level). Accordingly, if the user sets the broadcasting contents for 13-year-old or younger to be blocked in the broadcasting receiver as the rating information, the broadcasting receiver compares the rating information of the received contents with the rating value identifier of the stored RRT. Since the broadcasting receiver uses the level tag value (0xB1) corresponding to the rating value for age 13, the broadcasting receiver can keep on blocking the broadcasting contents for a 13-year-old or younger although the newly added rating value (age: 10) is present. Accordingly, although the RRT is changed, the user does not need to set the rating information in the broadcasting receiver again.

Figure 13:
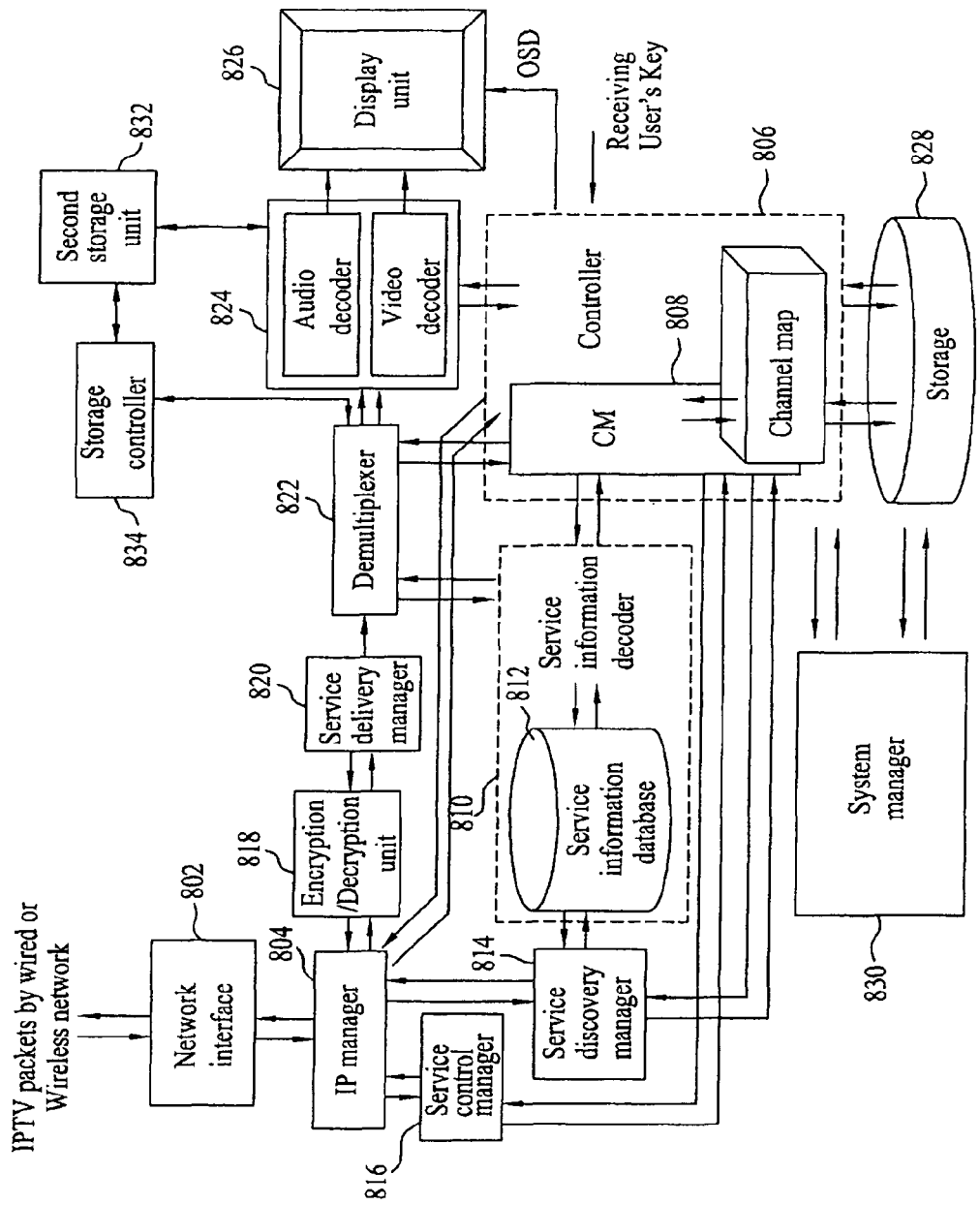
FIG. 13 is a block diagram showing the broadcasting receiver.

FIG. 13 is a block diagram showing the broadcasting receiver. The broadcasting receiver of FIG. 13 receives the broadcasting single according to the IP.

The broadcasting receiver of FIG. 13 includes a network interface 802, an IP manager 804, a controller 806, a channel manager (CM) 808, a service information decoder 810, a service information database 812, a service discovery manager 814, a service control manager 816, encryption/decryption unit (a conditional access system/digital right management (CAS/DRM) unit) 818, a service delivery manager 820, a demultiplexer 822, an audio/video decoder 824, a display unit 826, a first storage 828, a system manager 830, a second storage 832, and a storage controller 834. The service information decoder 810, the demultiplexer 822, and the audio/video decoder 824 may be collectively called a decoder.

In FIG. 13, the IP manager 804, the CM 808, the service discovery manager 814, the service control manager 816, the CAS/DRM unit 818, the service delivery manager 820 and the system manager 830 can be driven by the controller 806 in software.

The network interface 802 receives packets from a network and transmits packets transmitted by the broadcasting receiver to the network. The packets transmitted from the network to the network interface 802 may include rating region metadata or caption advisory metadata including the rating value identifier shown in FIGS. 9 and 10.

The IP manager 804 can process transmission/reception packets according to an IP protocol for setting source and destination information with respect to the packets transmitted by the receiver and the packets received by the receiver.

The encryption/decryption unit 818 performs a CAS function and a DRM function with respect to the packets received from the IP manager 804 and the packets received from the service delivery manager 820. Accordingly, the packets to be transmitted are encrypted and the received packets are decrypted.

The service delivery manager 820 can control a service including the digital contents received by the IP protocol in real time. For example, in a case where real-time streaming data is controlled, service data can be controlled using a real-time transport protocol/RTP control protocol (RTP/RTCP). The real-time streaming data can be transmitted using the RTP, and the service delivery manager 820 can parse the received data packets according to the RTP and output the parsed information to the demultiplexer 822. The network reception information is fed back to a server for providing a service using the RTCP.

The demultiplexer 822 demultiplexes a program specific information (PSI) section, a program and service information protocol (PSIP) section or a service information (SI) section and video/audio packets.

The service information decoder 810 decodes the sections associated with multiplexing of the service demultiplexed by the demultiplexer 822 and stores the decoded service information in the service information database 812.

The video/audio decoder 824 decodes the video data and the audio data demultiplexed by the demultiplexer 822. The video/audio data decoded by the video/audio decoder 824 is output via an output unit. The output unit may include a speaker for outputting an audio signal and a display unit for 826 outputting a video signal. In the example of FIG. 13, the video data is provided to the user via the display unit 826 and the decoded audio data is provided to the user via the speaker (not shown).

The service control manager 816 selects and controls the service. For example, in a case where the user selects a live broadcasting service, the service including the digital contents is selected and controlled using an IGMP or a real-time streaming protocol (RTSP). In a case where the user selects a service such as VOD, the service including the digital contents is selected and controlled using the RTSP. The RTSP can provide a trick mode to the real-time streaming. The service control manager can control a metadata stream including a configuration table or a service stream including the broadcasting contents to be parsed and control the broadcasting contents included in the service to be output in real time. The configuration table indicates table information including system and control information so as to decode the broadcasting contents. The configuration table may have information included in the metadata shown in FIGS. 9 and 10.

The service discovery manager 814 controls information necessary for selecting a service provider for providing a service. The service discovery manager 814 receives a control signal for channel selection from the CM 808 or the controller 806 and discovers a service according to the control signal. The service discovery manager 814 can parse the service discovery record for obtaining the digital contents included in the service. The service discovery record may include rating region metadata including the rating value identifier and content advisory metadata. The service discovery manager 814 can parse the service discovery record including the rating region metadata of FIG. 9 and the content advisory metadata of FIG. 10 and output the parsed information to the service information decoder 812.

The controller 806 controls the operation of the receiver according to a user control signal received from a graphic user interface or an on screen display (OSD) for the user. For example, the controller 806 receives a key input signal for channel selection from the user and transmits the key input signal to CM 808.

The CM 808 can generate a channel map. The CM 808 selects a service according to the key input signal received from the controller 806 and outputs the service discovery information of the service selected by the service discovery manager 814. The CM 808 receives the service information associated with the service from the service information decoder 810 and generates the channel map. The CM 808 may receive the information associated with the service from the service discovery manager 814 or the service information decoder 810 and generate the channel map according to the service. The CM 808 can control the demultiplexer 822 to selectively output an audio/video packet identifier (PID) of the channel selected by the user.

The first storage 828 stores setup data of the system. As the first storage, a nonvolatile RAM (NVRAM) or a flash memory may be used.

The system manager 830 controls the whole operation of the receiver system via a power source.

The second storage 832 receives and stores the video/audio data from the video/audio decoder 824 under the control of the storage controller 834. The second storage 832 performs a personal video recorder (PVR) function, and the storage controller 834 can control the input/output of the digital contents such that the second storage 832 performs the PVR function.

The controller 806 can control the above-described components such a desired service is output according to the key input of the user, and, for example, can control the digital contents to be provided to the user.

The demultiplexer 822 may demultiplex the packets including the rating region information and the content advisory descriptor, which is the same that rating region metadata and the content advisory metadata in shown in FIGS. 9 and 10, respectively.

The service information decoder 810 can decode the configuration table including the rating region information (rating region metadata) or the content advisory descriptor (content advisory metadata), which is output by the service discovery manager 814, and store the decoded information in the service information database 812. For example, the RRT including the rating value identifier may be stored in the service information database 812 or the first storage 828. The service information decoder 810 can decode the PMT including the content advisory descriptor having the rating value identifier and store the decoded data in the service information database 812.

The controller 806 can output a menu such that the user sets the rating information. The controller 806 can graphically generate and output the menu for setting the rating information on the OSD or drive an application for generating the menu and output the menu to the user. The user can select a rating criterion corresponding to the dimension and the level of the dimension in the rating information output via the menu. Then, the controller 806 can set the function of the broadcasting receiver associated with the broadcasting contents according to the rating value including the dimension and the level selected by the user.

The service information decoder 822 can demultiplex a broadcasting service included in the broadcasting signal, a program, and information for controlling the program. The information transmitted in the form of a table is called the configuration table.

The controller 806 can receive the rating information of the broadcasting contents output from the service discovery manager 814 or the demultiplexer 822, from the caption advisory descriptor parsed by the service information decoder 822. The controller 806 determines whether the rating information of the broadcasting contents which will be output by the selection of the user corresponds to the rating information which is set by the user via the user menu. If the rating information set by the user corresponds to the rating information of the broadcasting contents to be output, the broadcasting contents are blocked.

If the service information decoder 822 decodes the information that the version of the RRT is changed, the controller 806 controls the changed RRT to be stored in the service information database 812 or the first storage 828. The changed RRT may include the rating value identifier in addition to the dimension and the level. Since the rating value identifier included in the previous RRT and the rating value identifier of the changed RRT have the same value with respect to the same rating value, the same rating value can be identified by the same rating value identifier although the RRT is changed.

The controller 806 can obtain the rating information of the broadcasting contents which are currently selected by the user, from the caption advisory descriptor parsed by the service information decoder 812. This rating information may become the rating value identifier included in the changed RRT. Accordingly, the rating value identifier is not changed with respect to the rating value although the rating value is added to the RRT or is changed and thus the rating value can be identified by the rating value identifier.

Accordingly, the controller 806 can block the contents if the rating value of the broadcasting contents selected by the user corresponds to the rating value set by the user.

According to the embodiment of the present invention, it is possible to block the broadcasting contents without setting additional rating information of the user, although the RRT is changed.

Figure 14:
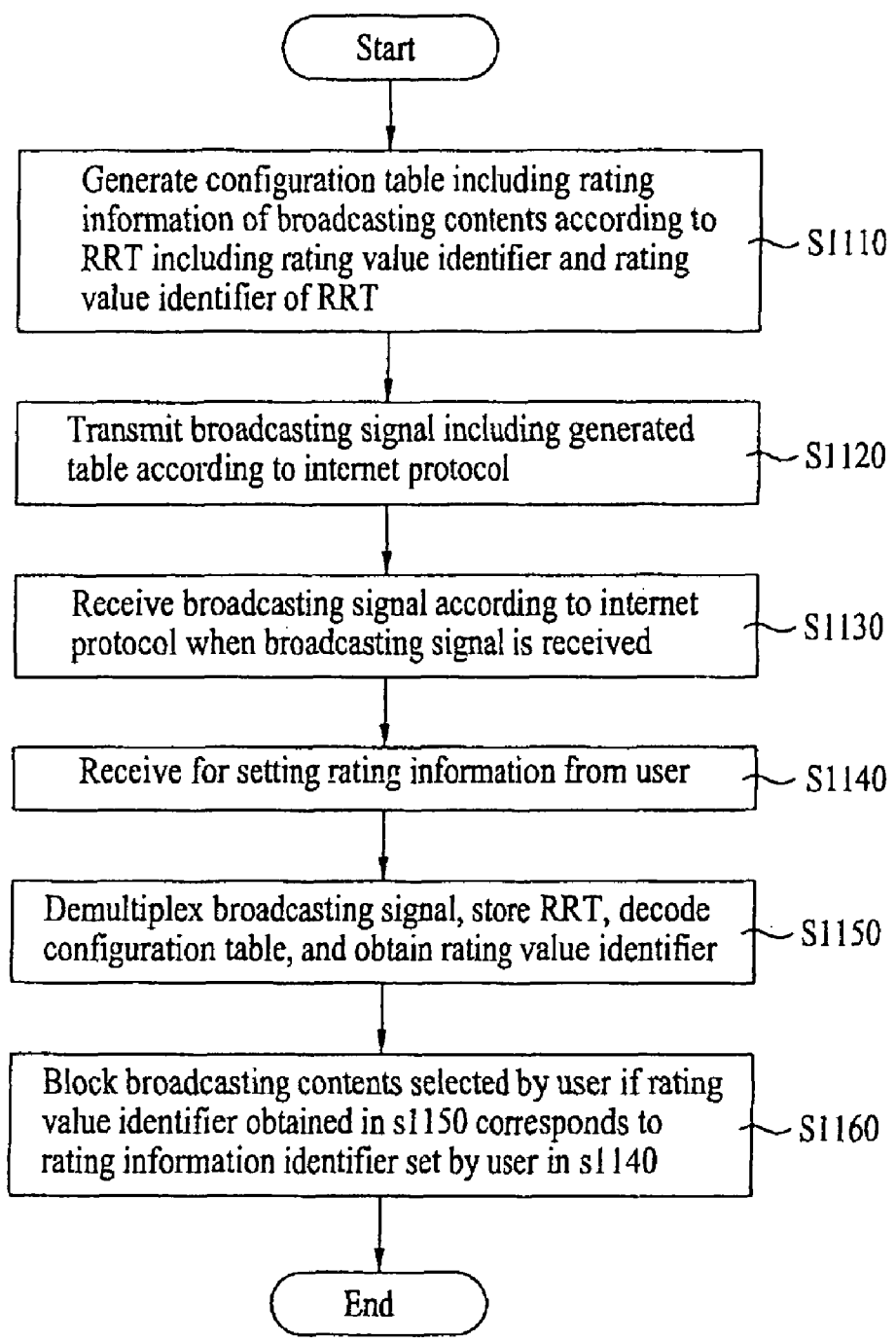
FIG. 14 is a view illustrating a method of transmitting/receiving a broadcasting signal according to the present invention.

FIG. 14 is a view illustrating a method of transmitting/receiving a broadcasting signal according to the present invention.

First, the configuration table including the rating information of the broadcasting contents is generated according to the RRT including the rating value identifier and the rating value identifier of the RRT (S1110).

The configuration table may be the PMT and the PMT may have the content advisory descriptor including the rating value identifier. The rating value identifier keeps on identifying a specific rating value, although the rating level is changed in the RRT.

The broadcasting signal including the generated table is transmitted according to the Internet protocol (S1120).

When the broadcasting signal is received, the broadcasting signal according to the Internet protocol is received (S1130).

A signal for setting the rating information is received from the user (S1140).

The broadcasting signal is demultiplexed, the RRT is stored, the configuration table is decoded, and the rating value identifier is obtained (S1150).

The configuration table may be the PMT and the PMT may have the content advisory descriptor including the rating value identifier. The RRT and the PMT may be included in the service discovery record as described above.

In a case where the broadcasting contents are selected and output from the service server, if the rating value identifier obtained in the step S1150 corresponds to the rating information identifier set by the user in the step S1140, the broadcasting contents selected by the user are blocked (S1160).

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A broadcasting receiver comprising:
    a reception unit configured to receive a broadcasting signal in accordance with an internet protocol (IP);
    a demultiplexer configured to demultiplex the broadcasting signal into a metadata stream including configuration tables and a service stream including a broadcasting content, wherein one table of the configuration tables includes a first element representing a rating value identifier identifying a unique rating value, a second element representing first rating value information indicating an abbreviated name of the unique rating value and a third element representing second rating value information indicating a full name of the unique rating value;
    a first decoder configured to decode the broadcasting contents; and
    a second decoder configured to decode the demultiplexed configuration tables and obtain the rating value identifier, the first rating value information and the second rating value information from the one table,
    wherein the broadcasting receiver blocks the broadcasting content in accordance with the rating value identifier, and
    wherein the rating value identifier keeps on identifying the unique rating value, although a new rating value having any rating level is added between rating values of the one table.

2. The broadcasting receiver of claim 1, wherein the one table is a Rating Region Table (RRT).

3. The broadcasting receiver of claim 2, wherein the RRT includes the rating value identifier as a tag value.

4. The broadcasting receiver of claim 1, wherein the one of the configuration tables from which the second decoder obtains the rating value identifier, is a program map table (PMT).

5. The broadcasting receiver of claim 1, wherein the rating value identifier is included in a content advisory descriptor.

6. The broadcasting receiver of claim 1, wherein the rating level is a level index.

7. A method of receiving a broadcasting signal, the method comprising:
    receiving a broadcasting signal in accordance with an internet protocol (IP);
    demultiplexing the broadcasting signal into a metadata stream including configuration tables and a service stream including a broadcasting content, wherein one table of the configuration tables includes a first element representing a rating value identifier identifying a unique rating value, a second element representing first rating value information indicating an abbreviated name of the unique rating value and a third element representing second rating value information indicating a full name of the unique rating value; and
    obtaining the rating value identifier, the first rating value information and the second rating value information from the one table,
    wherein the broadcasting content is blocked in accordance with the rating value identifier, and
    wherein the rating value identifier keeps on identifying the unique rating value, although a new rating value having any rating level is added between rating values of the one table.

8. The method of claim 7, wherein the one table is a Rating Region Table (RRT).

9. The method of claim 8, wherein the RRT includes the rating value identifier as a tag value.

10. The method of claim 7, wherein the one of the configuration tables, is a program map table (PMT).

11. The method of claim 10, wherein the PMT includes a content advisory descriptor having the rating value identifier.

12. The method of claim 7, wherein the rating level is a level index.

13. A method of transmitting a broadcasting signal, the method comprising:
    generating a configuration table including a first element representing a rating value identifier identifying a unique rating value in the configuration table, a second element representing first rating value information indicating an abbreviated name of the unique rating value and a third element representing second rating value information indicating a full name of the unique rating value, the rating value identifier corresponding to a rating value with respect to a rating criterion;
    generating a broadcasting signal including the configuration table; and
    transmitting the broadcasting signal in accordance with an internet protocol,
    wherein the rating value identifier keeps on identifying the unique rating value, although a new rating value having any rating level is added between rating values of the configuration table.

14. The method of claim 13, wherein the one table is a Rating Region Table (RRT).

15. The method of claim 14, the RRT includes the rating level value as a tag value.

16. The method of claim 13, wherein the configuration table is a program map table (PMT).

17. The method of claim 16, wherein the PMT includes a content advisory descriptor having the rating level value.

18. A broadcasting receiver comprising:
    a reception unit configured to receive a broadcasting signal in accordance with an internet protocol (IP);
    a demultiplexer configured to demultiplex the broadcasting signal into a metadata stream including configuration tables and a service stream including a broadcasting content, wherein one table of the configuration tables includes a first element representing a rating value identifier identifying a unique rating value, a second element representing first rating value information indicating an abbreviated name of the unique rating value and a third element representing second rating value information indicating a full name of the unique rating value;

a first decoder configured to decode the broadcasting contents; and a second decoder configured to decode the demultiplexed configuration tables and obtain the rating value identifier, the first rating value information and the second rating value information from the one table, wherein the broadcasting receiver blocks the broadcasting content by comparing the rating value identifier obtained from the configuration table with the rating value identifier set by a user, and wherein the rating value identifier keeps on identifying the unique rating value, although a new rating value having any rating level is added to between rating values of the one table included in the configuration table.

19. The broadcasting receiver of claim 18, wherein the rating level is a level index.

20. A method of receiving a broadcasting signal, the method comprising:

receiving a broadcasting signal in accordance with an internet protocol (IP);

demultiplexing the broadcasting signal into a metadata stream including configuration tables and a service stream including a broadcasting content, wherein one table of the configuration tables includes a first element representing a rating value identifier identifying a unique rating value, a second element representing first rating value information indicating an abbreviated name of the unique rating value and a third element representing second rating value information indicating a full name of the unique rating value; and obtaining the rating value identifier, the first rating value information and the second rating value information from the one table, wherein the broadcasting content is blocked by comparing the rating value identifier obtained from the configuration table with the rating value identifier set by a user, and wherein the rating value identifier keeps on identifying the unique rating value, although a new rating value having any rating level is added between rating values of one table.

* * * * *